Feb. 2, 1971  E. C. BUCK  3,560,308
TAPE APPLYING APPARATUS
Filed July 24, 1969  3 Sheets-Sheet 1
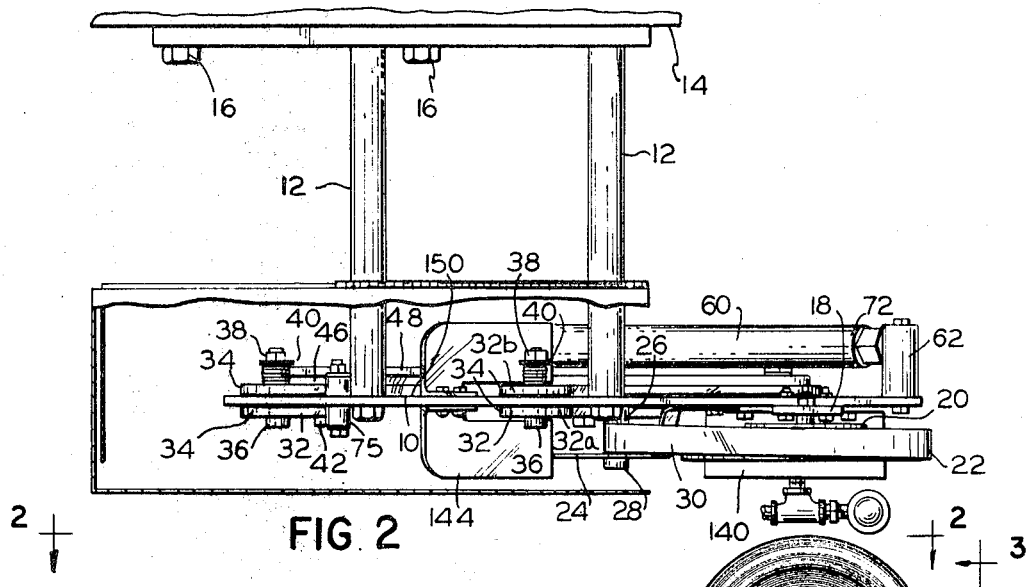
ERVILLE C. BUCK
INVENTOR
BY
BUCKHORN, BLORE, KLARQUIST & SPARKMAN
ATTORNEYS Feb. 2, 1971 E. C. BUCK 3,560,308
TAPE APPLYING APPARATUS
Filed July 24, 1969 3 Sheets-Sheet 2
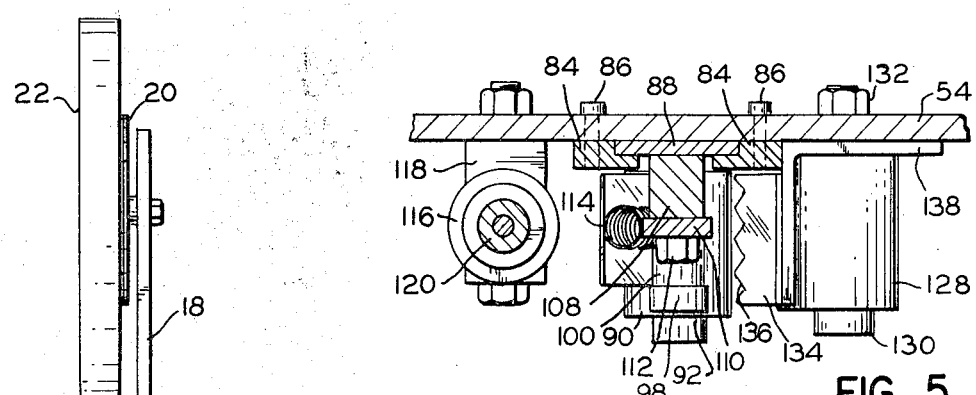
FIG. 5
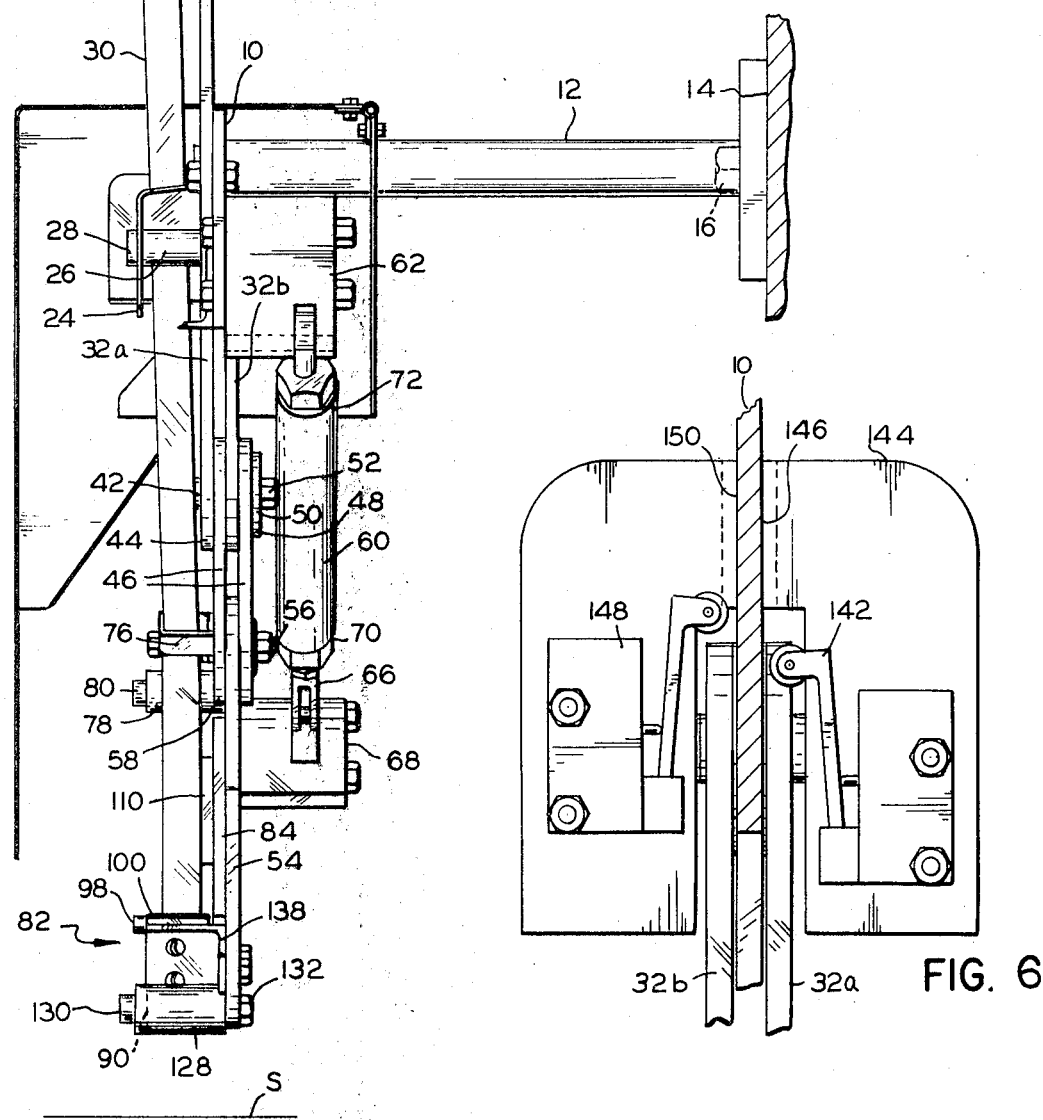
FIG. 3
FIG. 6
ERVILLE C. BUCK
INVENTOR
BY
BUCKHORN, BLORE, KLARQUIST & SPARKMAN
ATTORNEYS Feb. 2, 1971 E. C. BUCK 3,560,308
TAPE APPLYING APPARATUS
Filed July 24, 1969 3 Sheets-Sheet 3

ERVILLE C. BUCK
INVENTOR

BY
BUCKHORN, BLORE, KLARQUIST & SPARKMAN
ATTORNEYS

United States Patent Office 3,560,308
Patented Feb. 2, 1971

3,560,308
TAPE APPLYING APPARATUS
Erville C. Buck, Springfield, Oreg., assignor to The Willamette Valley Company, Eugene, Oreg., a corporation of Oregon
Filed July 24, 1969, Ser. No. 844,506
Int. Cl. B32b 31/04, 31/18
U.S. Cl. 156—522          7 Claims

ABSTRACT OF THE DISCLOSURE

An apparatus for applying a pressure-sensitive adhesive tape to a surface having a support structure to support a supply of pressure-sensitive adhesive tape above the surface, a pair of arms pivotally supported on the support structure and connected by a link at their lower ends, a second pair of arms pivotally connected to the first pair of arms at the lower ends thereof, and a carriage pivotally supported at the lower ends of the second pair of arms and adapted to carry a length of tape from the supply. A pneumatic piston and cylinder lower the carriage to a point at which the length of tape contacts the surface and adheres thereto and then advance the carriage horizontally and apply the tape to the surface. A knife is positioned on said carriage to sever the tape at a point prior to the termination of the horizontal advance of the carriage, and means are provided simultaneously to withdraw a slight excess of tape from the supply and return the carriage to its initial position with the excess tape in position to be applied to the surface during the next cycle of the apparatus.

Cross Reference to Related Application

This application relates to the invention disclosed in applicant's copending application, Ser. No. 776,525, filed Nov. 18, 1968, for a Tape Applying Apparatus.

Background of the Invention

This invention relates to apparatus for applying a pressure-sensitive adhesive tape to a surface, and more particularly, to an apparatus adapted to apply such a tape to the surface of a wood veneer.

In the preparation of wood veneers for the making of plywood, it is often necessary to apply a short length of pressure-sensitive adhesive tape across a crack in the ply or across a veneer patch to hold it in place. In the past this operation has been performed by hand. Such is time consuming and expensive. Applicant's above-mentioned copending application discloses an apparatus for applying such a pressure-sensitive adhesive tape to a veneer surface quickly and efficiently. The apparatus disclosed in the present application is simpler than the previously disclosed apparatus and, consequently, less expensive to construct.

SUMMARY OF THE INVENTION

The tape applying apparatus of the present invention comprises a support structure adapted to support a roll of pressure-sensitive adhesive tape above a surface to which the tape is to be applied. A first pair of arms are pivotally supported on the support structure and are connected by a link at their lower ends. A second pair of arms are pivotally attached to the lower ends of the first pair of arms on the same pivots as the link. A carriage is supported at the lower ends of the second pair of arms, the carriage being adapted to position a length of tape from the roll above the surface with an end portion extending therebeneath. Means are provided to lower the carriage to bring the end portion of the tape into contact with the surface and to advance the carriage horizontally to apply the tape to the surface. Means to sever the tape at a point prior to the termination of the horizontal advance of the carriage are also provided, and finally means are provided simultaneously to withdraw a slight excess from the supply and return the carriage to its initial position such that the excess tape is in position to be applied to the surface upon the next cycle of the apparatus.

BRIEF DESCRIPTION OF THE DRAWINGS

FIG. 1 is a front elevational view of the tape-applying apparatus of the present invention with its initial position illustrated in solid lines. The position of the apparatus at the time it first contacts the surface to which the tape is to be applied is illustrated in dash-dot phantom lines; and the position of the apparatus at the termination of the horizontal advance of the carriage is shown in phantom dotted lines.

FIG. 2 is a top view of the apparatus illustrated in FIG. 1.

FIG. 3 is an end view of the apparatus illustrated in FIG. 1 taken on line 3—3 thereof.

FIG. 5 is a sectional view taken on line 5—5 of FIG. 1.

FIG. 6 is a sectional view taken on line 6—6 of FIG. 1.

FIG. 8 is a detail of the tape braking mechanism.

DESCRIPTION OF THE PREFERRED EMBODIMENT

Figure 7:
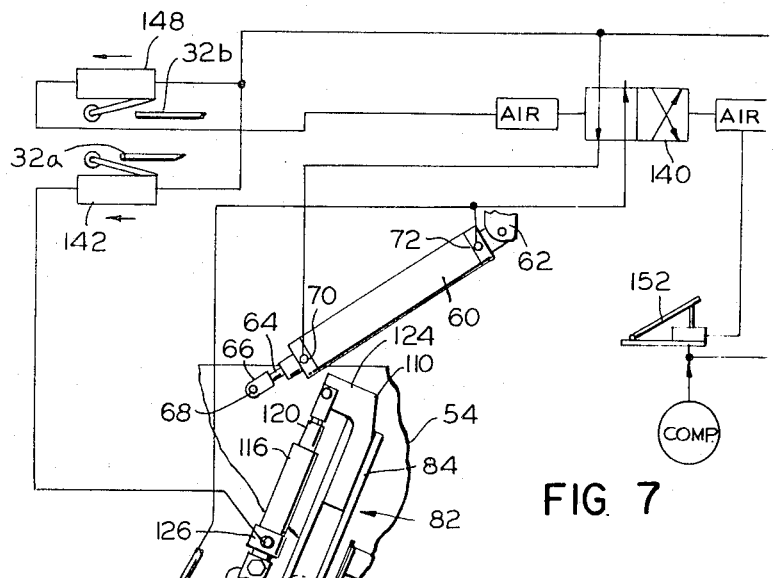
FIG. 7 is a schematic diagram of the pneumatic control system.
Figure 4:
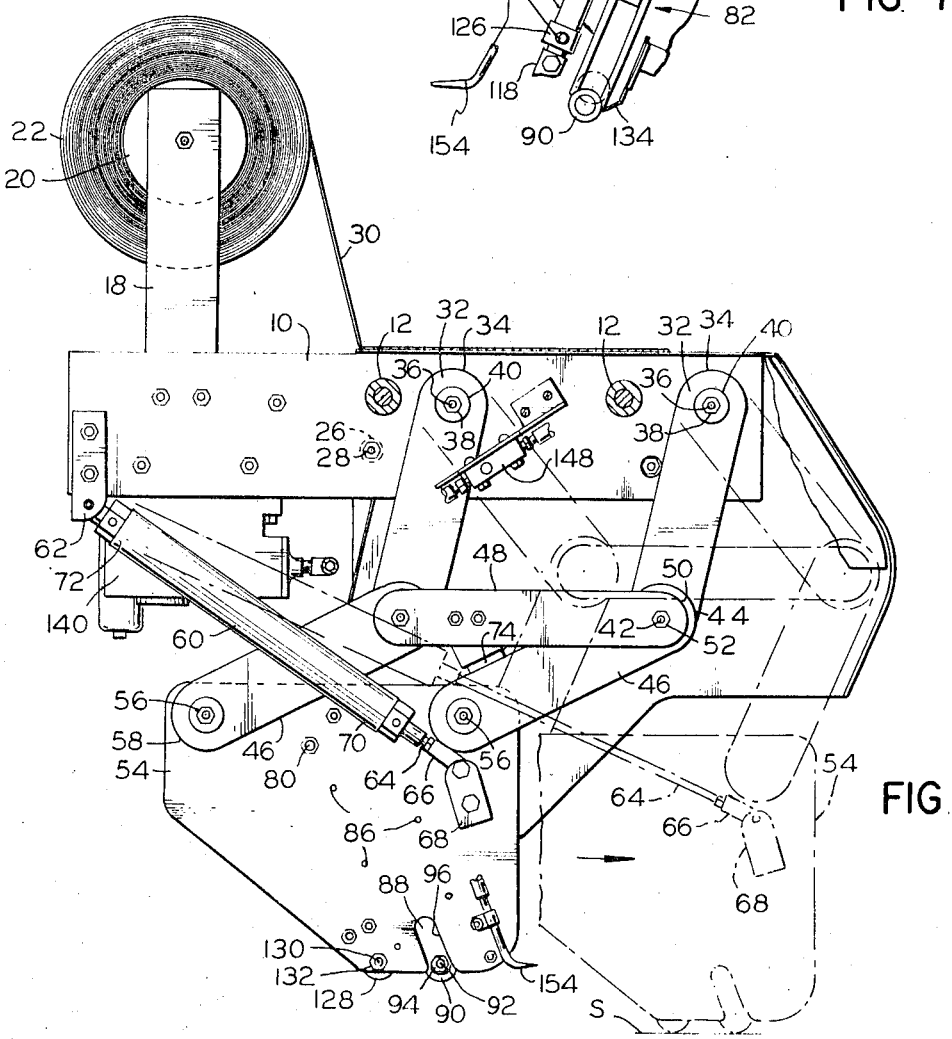
FIG. 4 is a rear elevational view of the tape-applying apparatus with the position of the apparatus at the beginning of its cycle shown in solid lines and the position of the apparatus at the termination of the horizontal advance of the carriage shown in phantom lines.

Referring to the drawings and in particular to FIGS. 1–4, the tape-applying apparatus of the present invention comprises a main support plate 10 bolted to a bracket 12 which is adapted to be mounted on a supporting structure such as a wall 14 by means of bolts 16. An arm 18 mounted on the plate 10 supports a reel 20 on which is mounted a roll 22 of pressure-sensitive tape such as masking tape. A bracket 24 bolted to the plate 10 supports a urethane roller 26 journaled on a bolt 28 over which roller 26 tape 30 from the roll 22 is entrained.

Two pairs of arms 32 are pivotally supported in parallel relation at their upper ends 34 by the plate 10. The arms 32 rotate on bolts 36 which are retained in position by nuts 38 exerting predetermined pressure against spring loaded washers 40. Journaled on bolts 42 passing through the lower ends 44 of arms 32 are two additional pairs of parallel arms 46 of the same length as the upper arms 32. A link 48 joins the lower ends 44 of the arms 32. The ends 50 of the link 48 are rotatably supported on the bolts 42, the entire assemblages being retained by nuts 52. A carriage plate 54 is rotatably supported on bolts 56 passing through the lower ends 58 of the arms 46. The plate 54 is sandwiched between the two pairs of arms 46 so that it is coplanar with the plate 10. By these means the plate 54 can be lowered and moved parallel to the plate 10, the link 48 ensuring that the arms 32 and 46 move in parallelism.

Means are provided for lowering and raising the carriage plate 54 into and out of contact with a surface S on which tape 30 from the roll 22 is to be applied and for moving the carriage parallel to said surface. Such means comprise an air cylinder 60 pivotally mounted on a bracket 62 bolted to the plate 10 and a piston rod 64 the outer end 66 of which is attached pivotally to a bracket 68 bolted to the plate 54.

The cylinder 60 is connected to a source of compressed air in a manner such that the piston rod 64 is normally retracted within the cylinder 60, thereby to maintain the plate 54 normally elevated above the surface S. (See solid line position in F 1.) Cutting the supply of compressed air to the lower end 70 of the cylinder 60 and supplying the upper end 72 thereof with compressed air causes the normally retracted piston rod 64 to be extended from the cylinder 60, thereby to lower the plate 54 into contact with the surface S and then to move the plate 54 horizontally along the surface S in a manner to be hereinafter described in more detail. A stop 74 mounted on the link 48 and adapted to engage one set of the arms 46 and another stop 75 on the plate 10 and adapted to engage one of the upper arms 32 determine the upper limit of movement of the plate 54 in the normally retracted position of the piston rod 64.

Mounted on the plate 54 is a tape guide 76 and beneath the guide 76 a urethane roller 78 journaled on a bolt 80. Tape 30 passing over the roller 26 passes through the guide 76, around the roller 78, thence through a tape applying and severing sub-assembly 82.

Sub-assembly 82 comprises a pair of generally L-shaped guides 84 attached to the plate 54 by screws 86. (See FIG. 5.) A plate 88 is slidably retained by the guides 84 against the plate 54. A urethane roller 90 is journaled on a shoulder bolt 92 attached to the plate 88 by a nut 94, and the roller is adapted to travel with the plate 88 by virtue of a recess 96 cut in the plate 54 at the lower edge thereof. (See FIG. 4.) Tape 30 from the roller 78 is entrained around the roller 90 which can then apply it to the surface S.

Also mounted on the plate 88 on a shoulder bolt 98 threadedly received therein is a lower tape guide 100. A brake 102 is riveted to the lower tape guide 100 and is provided with a leg 104 adapted to press the tape against the roller 90 to stop the flow of tape therearound. (See FIG. 8.) The guide 100 is provided with an outstanding leg 106 at its upper end. A mounting block 108 is attached to the plate 88 above the bolt 98. An L-shaped bracket 110 is attached to the mounting block 108 by bolts 112. A compression spring 114 is positioned between the lower end 113 of the bracket 110 and the leg 106 on the guide 100. The spring 114 urges the guide 100 toward the roller 90, thereby to cause the leg 104 on the brake 102 to maintain contact with the roller 90 during the operation of the apparatus.

Sub-assembly 82 also comprises an air cylinder 116 attached to a mounting bracket 118 bolted to the lower end of the plate 54 adjacent the roller 90. A piston 120 is received within the cylinder 116 and is attached at its upper end 122 to the generally horizontal arm 124 of the bracket 110. The cylinder 116 is connected to the source of compressed air at its lower end 126 so that when air is supplied thereto, the piston 120 is caused to extend, thereby to raise the plate 88 within the guides 84, which in turn raises the roller 90 and the brake 102 whose leg 104 is in contact therewith.

Also mounted at the lower end of the plate 54 is a second tape applying urethane roller 128 which is journaled on a shoulder bolt 130 attached to the plate 54 by a nut 132. A knife blade 134 having a generally serrated edge 136 is bolted to an L-shaped bracket 138 attached to the plate 54 such that the edge 136 is positioned between the rollers 90 and 128, but closer to the roller 90 and generally tangential thereto. When the piston 120 causes the plate 88 to be raised within the guides 84, tape 30 which is trained around roller 90 and which passes beneath roller 128 is likewise elevated by the action of the brake leg 104, thereby to be severed by the knife 134.

A pneumatic directional control valve 140 adapted to receive a supply of compressed air from a source not shown is mounted on the plate 10. The valve 140 is connected to the cylinder 60 by pneumatic air hoses in the manner shown in FIG. 7. A third limit switch 142 is mounted on a bracket 144 on the forward face 146 of the plate 10. (See FIG. 6.) Limit switch 142 is adapted to be triggered by the right upper arm 32a as the carriage plate 54 is moved horizontally from the right to the left as viewed in FIG. 1. Actuation of limit switch 142 permits compressed air to enter the cylinder 116, thereby to raise the plate 88 and cause the knife blade 134 to sever the tape.

A second limit switch 148 is mounted on the rear face 150 of plate 10 in a position slightly to the left of limit switch 142 (as viewed in FIG. 1), so that the rear right hand upper arm 32b triggers the limit switch 148 shortly after arm 32a triggers the limit switch 142. Actuation of the limit switch 148 reverses the control valve 140 to cause the compressed air to retract the piston 64 and return the plate 54 to its initial position.

FIG. 7 illustrates the position of the pneumatic controls at the beginning of a cycle. Compressed air from the source maintains the piston 64 retracted within the cylinder 60. A foot switch 152 permits compressed air to enter the control valve 140. Such shifts the valve, thereby forcing the piston 64 out of the cylinder 60 to lower the carriage plate 54 and commence a cycle of the apparatus. A portion of the compressed air is also forced out of a blower nozzle 154 for cleaning the surface preparatory to applying the tape.

OPERATION

The operation of the apparatus is as follows: When the operator steps on the foot switch 152, compressed air is introduced into the control valve 140, shifting the same to cause compressed air to enter the upper end 72 of the cylinder 60 and force the piston 64 outwardly therefrom. The carriage plate 54 is then moved downwardly on the arms 46 until the rollers 90 and 128 contact the surface S of the plywood. During this downward motion of the plate 54, the upper arms 32 remain stationary. Downward movement of the plate 54 is caused solely by rotation of the lower arms 46 on the bolts 42.

When the rollers 90 and 128 contact the surface S, the upper arms 32 rotate about the bolts 36 to permit the plate 54 to advance horizontally. The end of the tape which projects below the roller 90 then begins to be placed against the surface of the plywood so as to adhere thereto. Continued movement of the carriage plate 54 thus causes a length of tape to be applied to the surface.

After a predetermined length of travel, the upper arm 32a triggers the limit switch 142. Such permits a supply of compressed air to enter the cylinder 116 which causes the plate 88 to be raised. Such raises the tape applying roller 90. The action of the brake 102 maintains the tape in contact with the roller 90 so that when the roller is elevated, the tape is cut by the knife blade 134.

As indicated previously, the tape is severed by the knife blade 134 prior to the time that the carriage plate 54 reaches the end of its final stroke. Thus the plate 54 continues to travel horizontally along the surface S a short distance further until the upper arm 32b triggers the limit switch 148. When this occurs, compressed air is admitted to the opposite side of the control valve 140 and shifts the same back to its initial position, which retracts the piston 64. Since a slight additional amount of horizontal travel occurs subsequent to the time that the knife blade 134 cuts the tape, a slight excess of tape is withdrawn from the roll 22 by the continued movement of the roller 90 along the surface S. Thus when the piston 64 returns the carriage plate 54 to its initial position, a slight excess of tape projects downwardly over the tape-applying roller 90 to extend therebeneath in position for the next stroke.

In using the apparatus of the invention, a veneer to be patched is placed on a table beneath the apparatus and shifted so as to position a patch or crack beneath the stroke of the apparatus. The apparatus is then operated to apply the tape, and the veneer is shifted to the next position. This can be done easily and quickly, and panels may be patched at much less expense than by any of the procedures heretofore utilized. Obviously the apparatus has utility in applying tape to other surfaces.

I claim:
1. Apparatus for applying a pressure-sensitive adhesive tape to a surface comprising
a support structure adapted to support a roll of pressure-sensitive adhesive tape above said surface;
a first pair of arms pivotally mounted at their upper ends on said support structure;
a link pivotally attached to said first pair of arms at their lower ends to maintain the same in parallel relation;
a second pair of parallel arms pivotally attached to said lower ends of said first pair of arms;
carriage means supported on said lower ends of said second pair of arms, said carriage means being adapted to position a strip of tape from said roll above said surface with an end portion extending therebeneath;
means to lower said carriage means to bring said end portion of said tape into contact with said surface and to advance said carriage means horizontally to apply a length of said tape to said surface;
means to sever said length of tape from said strip at a point prior to the termination of the horizontal advance of said carriage means; and
means to return said carriage means to its initial position with an end portion of said strip of tape extending therebeneath.

2. The apparatus of claim 1 in which said carriage lowering and advancing means comprise
an air cylinder pivotally mounted on said support structure, and
a piston received in said air cylinder, the outer end of said piston being pivotally attached to said carriage means.

3. The apparatus of claim 1 in which said carriage means comprise a carriage plate attached to said second pair of arms at their lower ends, said carriage plate being coplanar with said support structure.

4. The apparatus of claim 3 further comprising a first surface contacting roller slidably mounted on said carriage plate, said strip of tape being entrained around said roller.

5. The apparatus of claim 4 further comprising a second tape applying roller journaled on said plate, said strip of tape entrained around said first roller passing beneath said second roller, said severing means being positioned between said rollers.

6. The apparatus of claim 5 further comprising pneumatic means adapted to raise said first roller prior to said termination of said horizontal advance of said carriage plate, said pneumatic raising means elevating said strip of tape to cause the same to be severed by said severing means.

7. The apparatus of claim 6 further comprising brake means adapted to contact said first roller to maintain said strip of tape in contact therewith during severing thereof.

References Cited

UNITED STATES PATENTS

| | | | |
|---|---|---|---|
| 3,066,723 | 12/1962 | Remington et al. | 156—522 |
| 3,099,026 | 7/1963 | Reid et al. | 156—522X |
| 3,206,911 | 9/1965 | Carle et al. | 156—522X |

BENJAMIN A. BORCHELT, Primary Examiner

J. M. HANLEY, Assistant Examiner

U.S. Cl. X.R.

156—526, 545